(12) United States Patent
De Gaillard

(10) Patent No.: US 6,474,731 B2
(45) Date of Patent: Nov. 5, 2002

(54) MOTOR VEHICLE WITH AN OPENABLE VEHICLE ROOF

(75) Inventor: Francois De Gaillard, Mouilleron en parreds (FR)

(73) Assignee: Webaston Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/848,538

(22) Filed: May 4, 2001

(65) Prior Publication Data

US 2002/0003359 A1 Jan. 10, 2002

(30) Foreign Application Priority Data

May 4, 2000 (DE) .......................................... 100 21 464

(51) Int. Cl.$^7$ ............................... B60J 7/047; B60J 1/18
(52) U.S. Cl. ............................. 296/220.01; 296/146.14; 296/147
(58) Field of Search ....................... 296/216.04, 220.01, 296/222, 146.14, 147

(56) References Cited

U.S. PATENT DOCUMENTS

| | | | | |
|---|---|---|---|---|
| 5,421,635 A | * | 6/1995 | Reinsch et al. | ......... 296/220.01 |
| 5,944,378 A | * | 8/1999 | Mather et al. | ...... 296/146.14 X |

FOREIGN PATENT DOCUMENTS

| | | | | |
|---|---|---|---|---|
| DE | 295 09 682 | | 11/1996 | |
| DE | 296 02 316 | | 7/1997 | |
| DE | 196 34 507 | | 1/1998 | |
| DE | 298 12 103 | | 12/1999 | |
| DE | 198 45 734 A1 | | 4/2000 | |
| EP | 0101322 | * | 2/1984 | ................. 296/222 |
| EP | 0 101 322 A2 | | 2/1984 | |
| EP | 0 591 644 | | 4/1997 | |
| EP | 0 989 008 A2 | | 3/2000 | |
| FR | 2 718 485 | | 10/1995 | |
| FR | 2 744 957 | | 8/1997 | |
| JP | 356149213 | * | 11/1981 | ............ 296/216.04 |

* cited by examiner

*Primary Examiner*—Dennis H. Pedder
(74) *Attorney, Agent, or Firm*—Nixon Peabody LLP; David S. Safran

(57) ABSTRACT

A motor vehicle, especially a limousine or a coupe, with a motor vehicle roof with body-mounted lengthwise-extending roof side rails (5), with a roof opening in the motor vehicle roof, with a movable roof part arrangement, especially a louvered roof, for selectively closing or at least partially clearing the roof opening, and with a rear window (13) which adjoins the motor vehicle roof, the movable roof part arrangement or the louvered roof having elements or louvers (7) which are movably guided on lateral guides and which can be lowered into a rear storage space (16) which is located essentially under the equator line (17) of the motor vehicle when the roof is opened. The rear window (13) is movable by guides on the body and can be lowered from its closed position, in which it closes a rear window opening in the vehicle body, into an open position in which it is removed from the rear window opening and is located at least partially under the trunk lid (2).

13 Claims, 6 Drawing Sheets

MOTOR VEHICLE WITH AN OPENABLE VEHICLE ROOF

BACKGROUND OF THE INVENTION

1. Field of the Invention

The invention relates to a motor vehicle, especially a limousine or a coupe, with a motor vehicle roof with body-mounted lengthwise roof rails, with a roof opening in the motor vehicle roof, with a movable roof dividing means for selectively closing or at least partially clearing the roof opening, and with a rear window which adjoins the motor vehicle roof.

2. Description of Related Art

When driving in an open passenger car such as, for example, a convertible, in an accident in which the vehicle overturns, there is a high risk of injury to the passengers. Therefore, in convertibles, there are fixed or retractable roll bars for passenger protection when the roof is open. Limousines and coupes offer high safety in a rollover, but when an openable roof, for example, a sliding roof, is installed, only a limited roof opening is possible which ordinarily cannot impart the same feeling as when driving in an open convertible.

Published European Patent Application EP 0 591 644 B1 describes a motor vehicle with a roof which has a roof opening which can be selectively closed or at least partially opened by means of the louvers of a louvered roof. To open the roof opening, the louvers, which are movably supported on bilateral roof-mounted guides, are moved to the rear to under the fixed roof part which adjoins the roof opening to the rear. In the lowered position, the louvers can be stacked into a package of relatively low height or they are located at a mutual vertical distance like blinds in front of the rear window.

French Patent FR 2 718 485 discloses a sliding headliner for a closed transparent motor vehicle roof. The sliding headliner contains individual louvers which are movably supported on bilateral lengthwise roof guides. When the sliding head liner is opened, the individual louvers are pushed to the rear to under the transparent motor vehicle roof into a storage position in which they are located on top of one another as a package.

DE 196 34 507 C1 discloses a motor vehicle roof which can be lowered into the rear of a passenger car. A movable roof arrangement which is provided selectively for closing or clearing a roof opening is made especially as a louvered roof which can be folded up in the form of a package when opened on the roof frame and can be lowered with the motor vehicle roof in the rear of the vehicle.

German Utility Model DE 298 12 103 U1 describes a convertible limousine which has a roof superstructure with body-mounted lengthwise roof rails, and the roof superstructure can be opened by the roof parts, which are movably supported between the lengthwise roof rails, and the rear window being arranged as a stack which can be stowed in a cavity of the rear hatch or the trunk lid. The rear window is movably supported on an inner part of the rear hatch by means of front and rear sliding cranks. Furthermore, on the inner hatch part, on the back side, a cover is pivotally coupled which is opened to allow space for the stack as it is pushed into the cavity of the rear hatch.

SUMMARY OF THE INVENTION

A primary object of the present invention is to devise a roof for a motor vehicle which can be opened over a large area and which still has a high stiffiess as passenger protection in a vehicle rollover.

This object is achieved in a motor vehicle of the initially mentioned type by, in accordance with the invention, the roof dividing means having roof dividing elements which are movably guided on lateral guides and which can be lowered into a rear storage space which is located especially essentially under the equator line of the motor vehicle when the roof dividing means is opened, and by the rear window being movable by a guide means on the body so as to be lowered from its closed position in which it closes a rear window opening in the body into an open position in which it is moved away from the rear window opening and is located at least partially under the trunk lid. In this way, a roof opening can be formed which extends as in a convertible from the front window as far as the trunk lid over the entire passenger compartment, but which, in contrast to a convertible, leaves the lengthwise roof rails in their body-mounted arrangement, thus making available improved passenger protection if the motor vehicle rolls over and comes to rest up-side-down.. The lengthwise roof rails are attached via the rear roof columns, for example, the C columns, to the body.

The rear storage space for the roof dividing elements is located preferably in a lowered position so that it is not raised or is not significantly raised over the equator line of the motor vehicle which is formed by the lower edge of the side windows and the trunk lid. Thus, unobstructed visibility from the vehicle interior to the rear is not hindered. The storage space is thus behind the rear seats roughly underneath the top edge of the rear seats in a fourseat or five-seat limousine. The arrangement of the guide means for the rear window directly on the body or the body structure yields a simpler structure relative to a guide on the rear hatch.

The movable roof dividing means is especially a louvered roof which can be used, preferably, for closing the roof opening, and when opened, can be transferred into a compact arrangement in the rear storage space. The roof dividing elements or the louvers can be simply movable lengthwise or they can be swung out of their closed position also into a ventilation position, or they are attached to one another as louver parts which are narrow in the lengthwise direction in the manner of blinds and are rolled up in the storage space. Instead of the louvers, a roof dividing means with a flexible cover, for example, a folding roof, can be used.

Depending on the size of the rear window and the trunk lid, the rear window can be located partially or completely in the open position under the trunk lid. Especially when the closed rear window and the trunk lid in the lengthwise direction are at an angle to one another, is the rear window pivoted during the opening process around its rear edge so that it is accommodated as much as possible parallel under the trunk lid, and thus saving space in the trunk.

In order to move the tilted rear window in a space-saving manner to under the trunk lid, it is a good idea if the rear window in the area of its rear edge is supported to be able to pivot around a transverse axis on a rear guide means.

Preferably, the rear guide means has two especially parallel lengthwise guide rails which are spaced apart and which are located in the side areas of the trunk. Thus, the accessibility of the trunk is not hindered by the guide means, and secure and solid support and guidance are formed by the wide guide base.

On the rear window, bearing parts, such as journals which project laterally are feasibly attached and are movably guided on the lengthwise guide rails, and the bearing parts can be coupled to the sliding elements which are movably supported in the lengthwise guide rails and which can be moved by a drive means.

For reliable guidance of the rear window, it can be coupled in the area of its front edge to a front guide means which can have two nonparallel guide rails on which the rear window is movably supported via compensation elements. Nonparallel guide rails can be used which are matched to the C columns which run from the roof sloped to the outside.

Preferably, the rear window is guided in the opening process by the front guide means in an initial lowering motion out of a rear window frame.

The roof dividing elements or louvers can be guided on lengthwise guides which run along the side lengthwise roof rails and down to the storage space, and they are moved by a drive means located preferably on an apron.

Preferably, there is an actuating means with which the louvered roof an d the rear window can be opened and closed in a coupled sequence or independently of one another.

According to one embodiment, the storage space for the roof dividing elements or the louvers is covered by a cover, especially a hat rack (shelf behind the rear seat), or the interior cover of the trunk with the louvered roof closed, and it is readied to accommodate the louvers by removing the cover from its cover position.

The cover can be moved into a lower position in which it forms the bottom of the storage space.

One embodiment of the motor vehicle is explained in detail below with reference to the accompanying drawings.

DETAILED DESCRIPTION OF THE INVENTION

Figure 4:
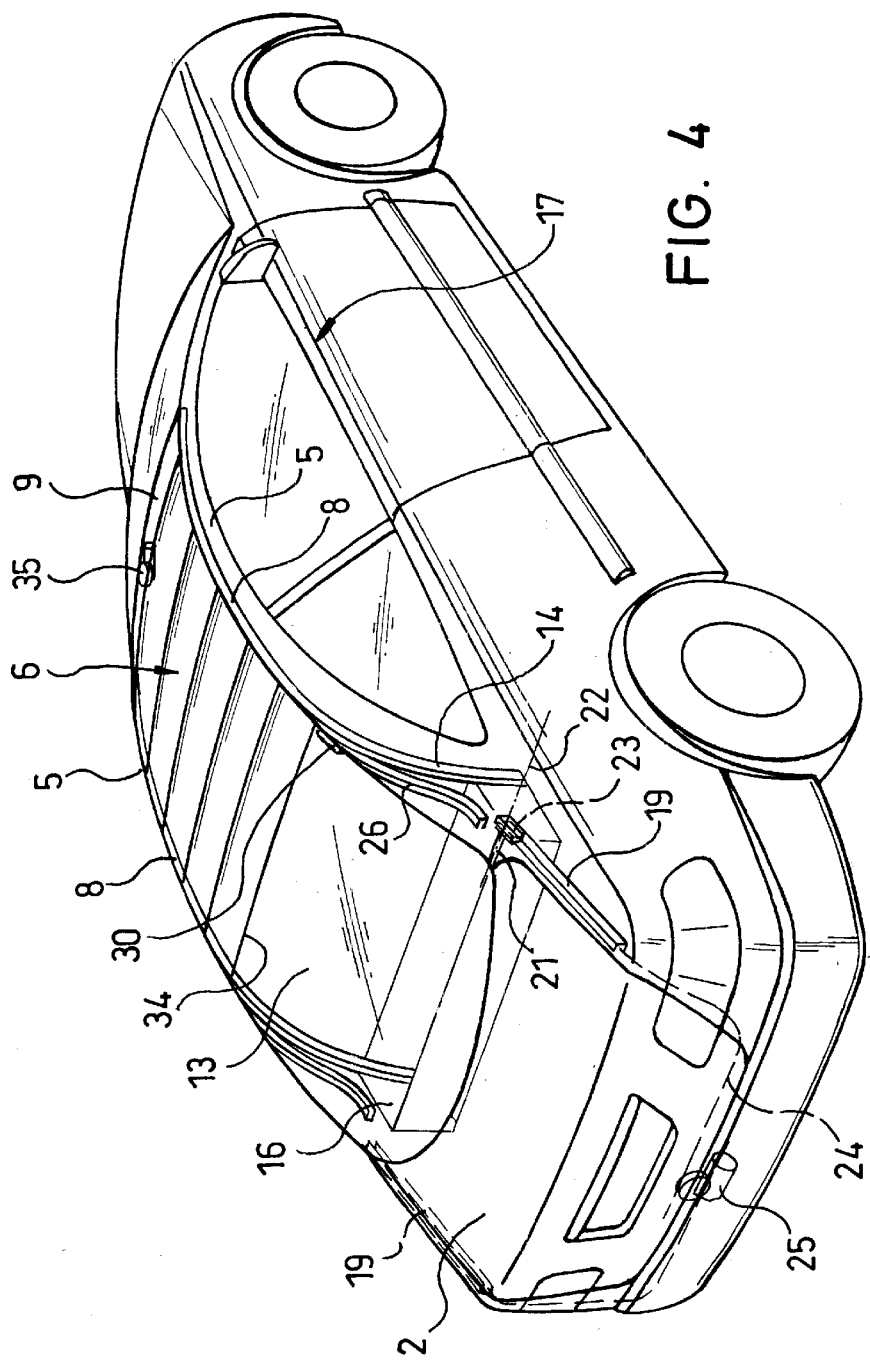
FIG. 4 is a perspective rear view of the motor vehicle showing the bearing and guide means for the louvered roof and the rear window.

A motor vehicle 1 (see FIG. 1) which, in the illustrated embodiment, is a passenger car in the manner of a limousine or a coupe with a trunk 3 which can be closed by a trunk lid 2, has a roof 4 with lengthwise extending side roof rails 5, between which there is a louvered roof 6 for selectively closing or at least partially clearing a roof opening which is formed between the side roof rails 5. The louvered roof 6 is formed from several louvers 7 which extend in the transverse direction of the vehicle and are movably supported at their opposite ends on a respective one of guide rails 8 (see FIG. 4) which are attached or made on the side roof rails 5. The side roof rails 5 run from the area of the apron 9 which is located on the top edge of the windshield 10 at the A columns 11 rearward to the C columns 12 which are securely anchored to the body. The rear window 13 is located between the closed louvered roof 6 and the trunk lid 2.

Figure 5:
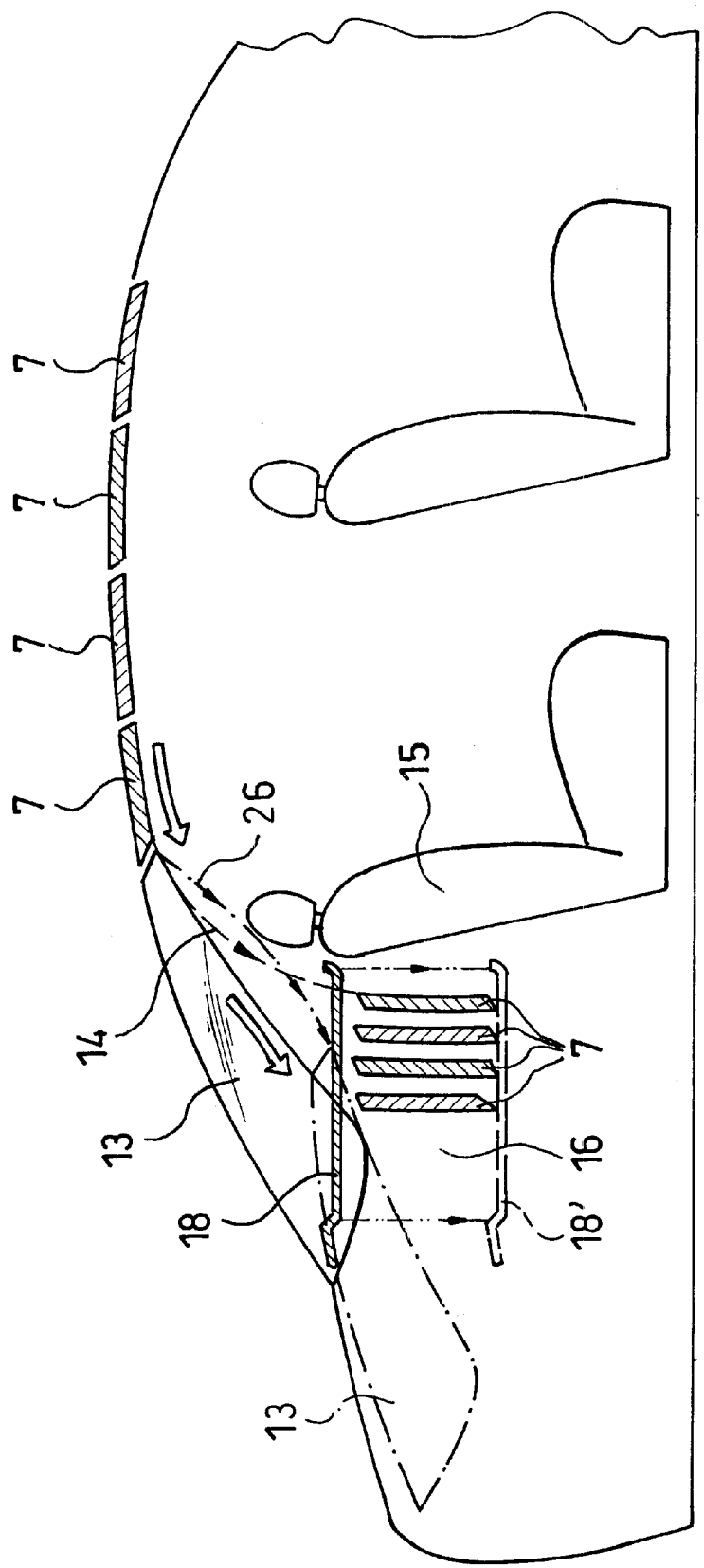
FIG. 5 is a schematic side view of the motor vehicle with the louvered roof and the rear window in different positions.

The guide rails 8 for the louvers 7 run rearward along a curved path segment 14 (see FIGS. 4 & 5) on the inside of the C columns 12 and behind the rear seat backs 15, down as far as a storage space 16 for the louvers 7 which is located roughly underneath the equator line 17 of the vehicle in the top section of the trunk 3 and between the lower edge or rear edge 20 of the rear window 13 and the backs 15 of the rear seats. The storage space 16 is covered by a cover which is, for example, a hat rack 18, i.e., the shelf behind the rear seat back, when the louvered roof 6 is closed. When the louvered roof 6 is opened, the hat rack 18 is moved at least partially away from its covering position so that the louvers 7 can be moved into the storage space 16 and can be deposited in order there. The storage space 16 can have a fixed covering as is shown schematically in FIG. 4. The hat rack 18 which is shown in FIG. 5 is movably supported on guides (not shown) and can be lowered into the additionally illustrated position (labeled 18') in which it forms the bottom for the storage space 16. When the louvered roof 6 is closed the storage space 16 is preserved as a cargo space in the trunk 3.

The hat rack 18 can also be divided in the transverse direction into a front and a rear section so that only the front section is lowered to make available the storage space 16.

The individual louvers 7 are connected to one another such that they lie adjoining one another in the closed position and close the roof opening (see FIG. 1) and that they are pushed in their entirety along the guides 8 to the rear into the storage space 16 to open the roof opening, where they are successively stacked next to one another in a package-like arrangement. The mutual coupling of two adjacent louvers 7 at a time takes place, for example, in the manner described in the above-mentioned French Patent FR 2 718 485 for the louvers of a louvered sliding headliner located under a glass cover while having louvers move from a guide rail in to an arrangement in which they stacked in vertical alignment can take place in the manner described in published European Patent Application EP 0 989 008 A2. A drive motor 35 for the louvered roof 6 is located, for example, in the area of the apron 9 and is connected via compressively stiff drive cables to the bearing elements of the louvers 7, which elements are held in the guides 8.

The rear window 13 has a rear guide means which has two guide rails 19 which are spaced apart from one another within the two top side areas of the trunk 3, the guide rails 19 being located as far as possible from the rear side walls. The rear window 13, in the area of its rear edge 20, has two laterally projecting bearing elements 21, for example, two journals which form a common pivot axis 22 and which are joined to the respective sliding elements 23 which are movably supported in the guide rails 19, to be able to pivot around this pivot axis 22. The two sliding elements 23 are connected via compressively stiff drive cables 24 to an electric drive motor 25 which is located in the rear area and can be moved synchronously by it.

Figure 6:
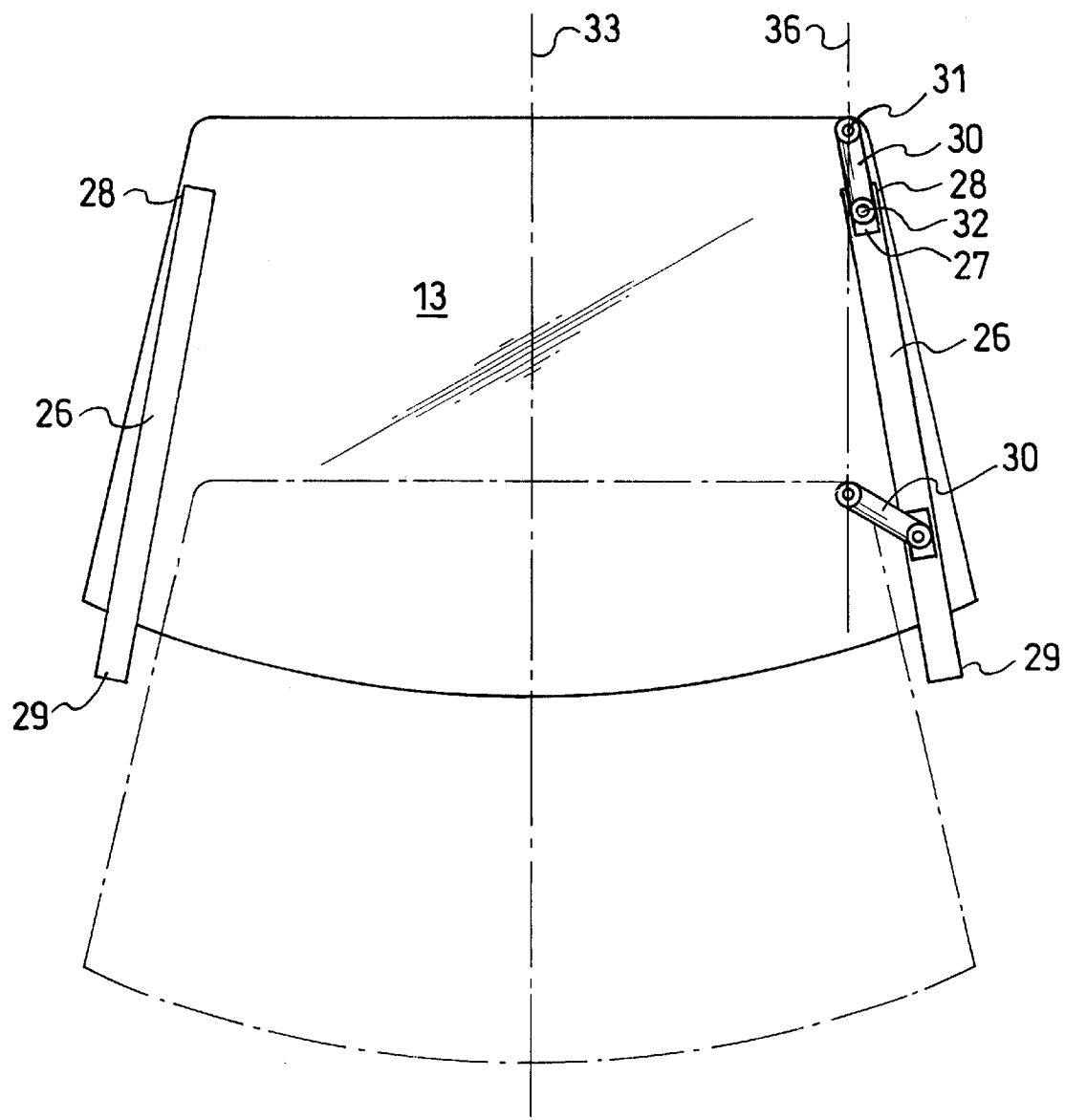
FIG. 6 a plan view of the rear window with a guide means.

The rear window 13 also has a front guide means which contains two guide rails 26 (see FIG. 4) which are located on the insides of the C columns 12 and in which a respective sliding element 27 (see FIG. 6) is movably held. The two guide rails 26, in a vertical overhead view, are obliquely angled upwardly toward the center plane 33 of the motor vehicle, the top ends 28 of the guide rails 26, according to the inclined C columns 12, lying nearer together than the bottom ends 29. In the two top corner areas of the rear window 13, a respective pivot lever 30 is attached to be able to pivot around a pivot axis 31 which is roughly perpendicular to the rear window 13 (in FIG. 6 only the right pivot lever 30 is shown in the closed position of the rear window 13 and in the open position of the rear window 13). The pivot lever 30 is pivotally mounted on the sliding element 27 on a pivot axis 32. In the pivoting motion of the rear window 13 into its open position (shown in FIG. 6 with broken lines) the pivot lever 30 is swung since the pivot axis 31 is moved with the rear window 13 in the plane 36 which is parallel to the vertical lengthwise center plane 33 of the motor vehicle. In this way, the path between the pivot axis 31 and the sliding element 27 which is moving away from it is compensated for in the guide rail 26.

Figure 1:
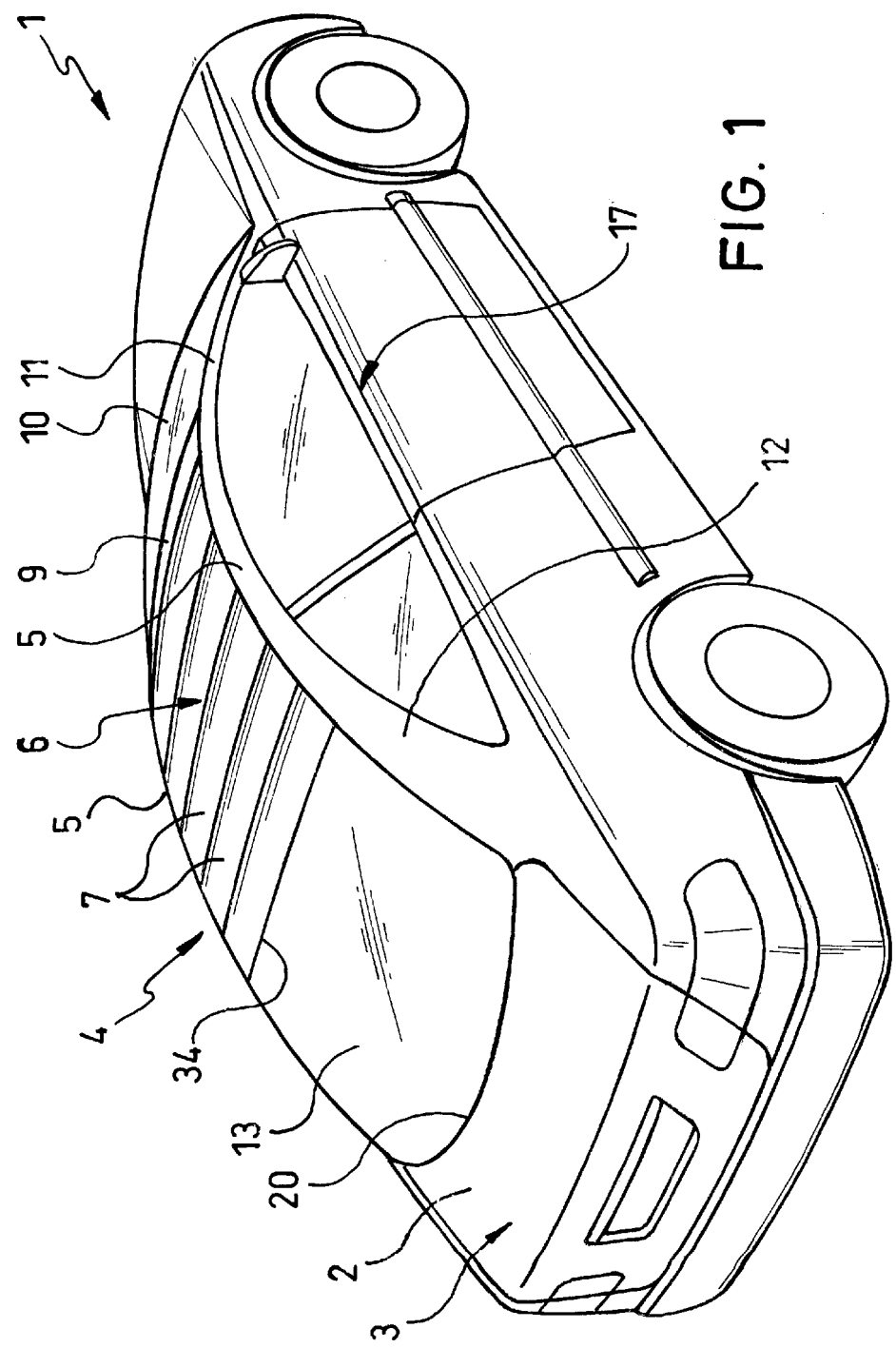
FIG. 1 is a perspective rear view of a motor vehicle with a louvered roof and an adjoining rear window in the closed position.
Figure 2:
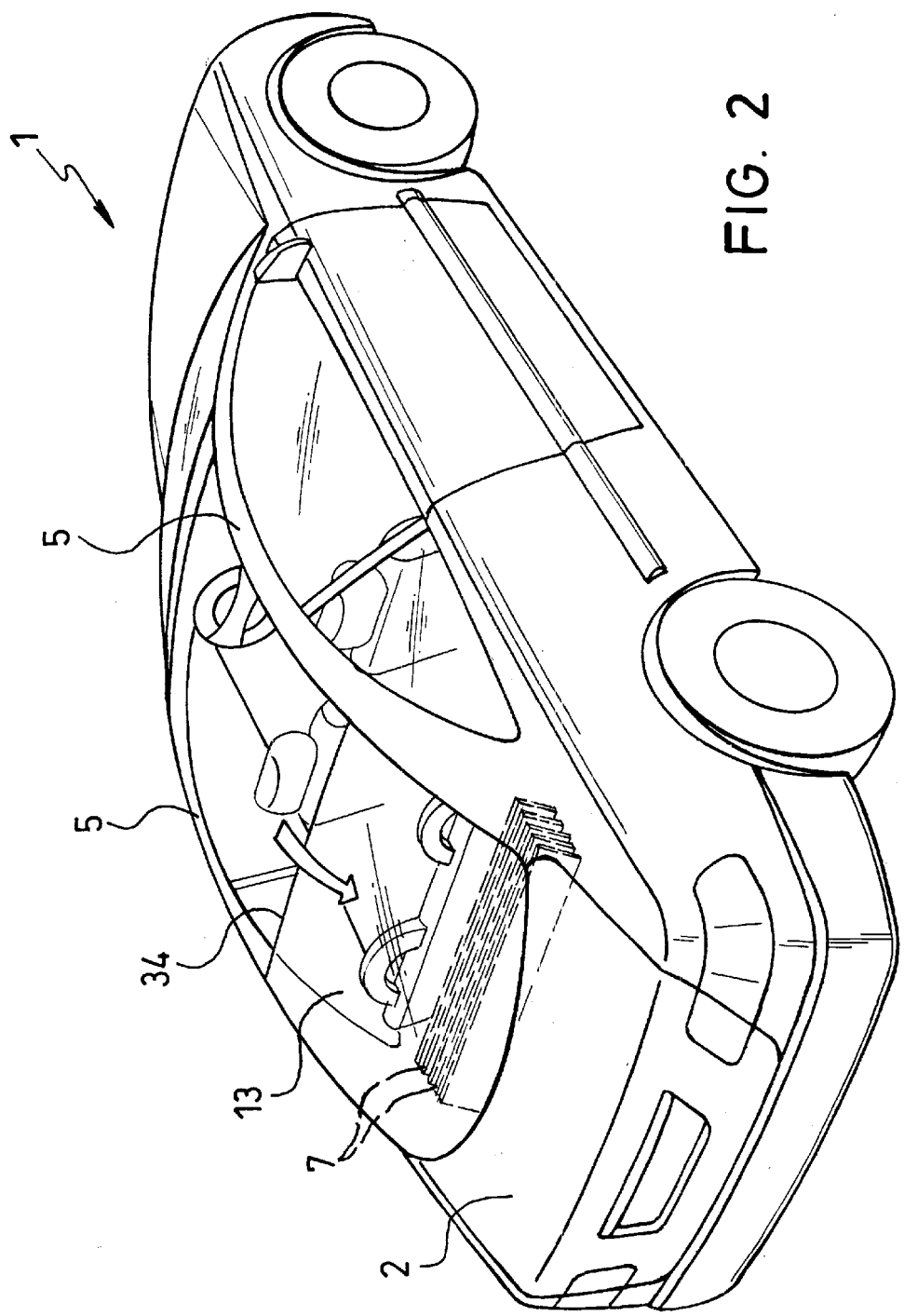
FIG. 2 is a perspective rear view according to FIG. 1 but with the louvered roof opened and lowered.

To clear the opening which is occupied by the rear window 13 in the closed position and which is bordered by the two C columns 12, the rear louver 7 (in the closed state of the louvered roof 6 as shown in FIG. 1) and the front edge of the trunk lid 2, after opening the louvered roof 6 via the drive motor 25 and the drive cable 24, the two sliding elements 23 are pushed to the rear in the rear guide rails 19, pulling the rear window 13 down and to the rear to under the trunk lid 2. In doing so, the forward edge 34 of the rear window 13 follows the run of the two front guide rails 26 which are curved in a lateral overhead view, and on their upper end 28 on the initial path segment, lower the rear window more dramatically so that the rear window 13 is moved out of tight contact with the rear window seal which surrounds the opening towards the vehicle interior. Thus, the rear window 13 is pivoted around the lower pivot axis 22 while it is moved at its rear edge 20 to under the trunk lid 2.

Figure 3:
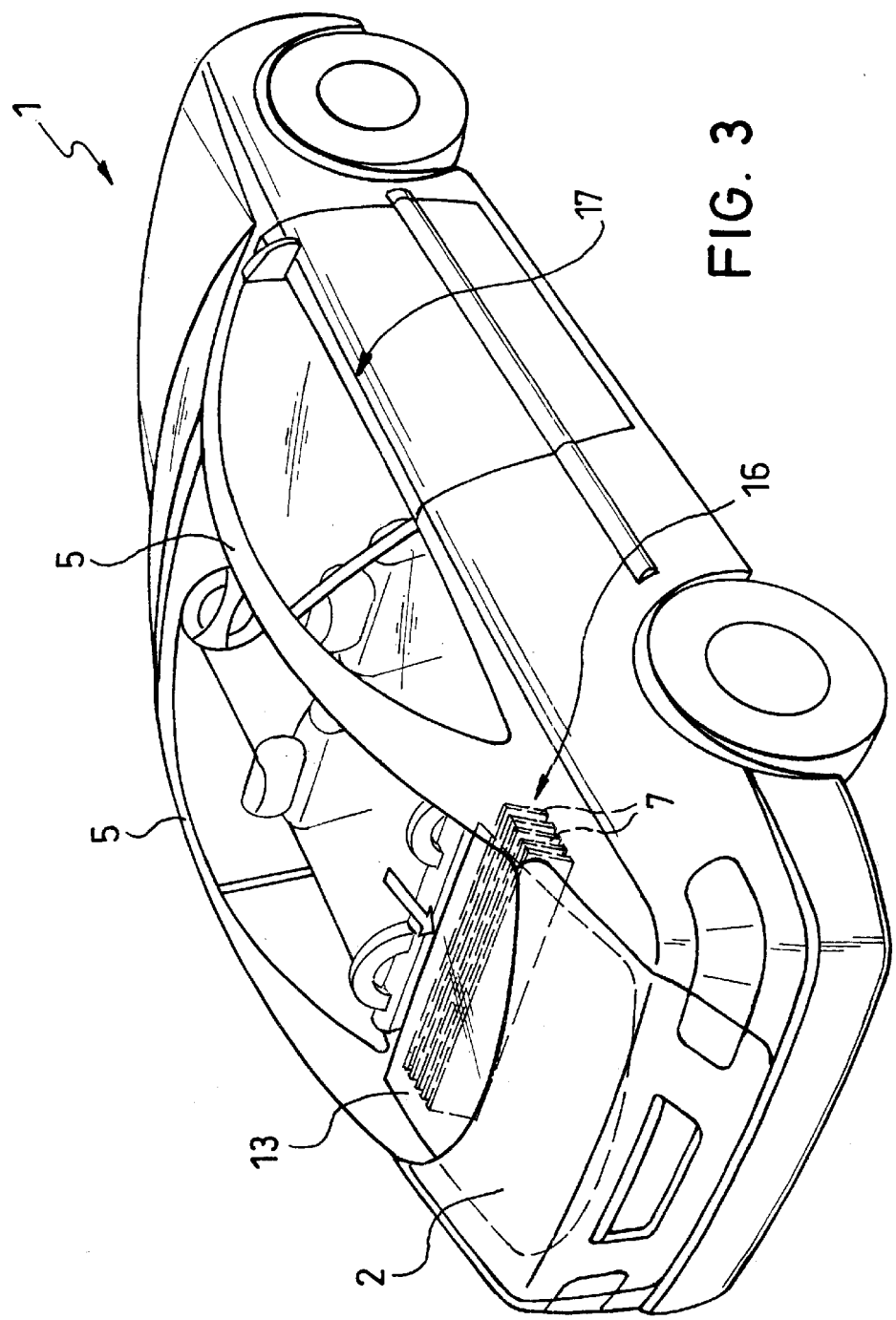
FIG. 3 is a perspective rear view as shown in FIG. 2 but with the rear window additionally opened.

In the completely opened position of the louvered roof 6 and the rear window 13 (see FIG. 3), a roof opening with a size similar to a convertible is thus formed, but with the lengthwise roof rails 5 and the C columns 12 remaining in their position and forming a rigid structure which, in the case of rollover, offers a high level of protection to the passengers.

By means of an actuating device, first the louvered roof 6 can be opened and deposited in the storage space 16 and then the rear window 13 can be opened and moved at least partially to under the trunk lid 2. The closing of the roof takes place in the reverse sequence of motion. Of course, selectively, only the louvered roof can also be opened.

What is claimed is:

1. Motor vehicle comprising:
    a roof opening in the roof
    a movable roof part arrangement for selectively closing and at least partially clearing the roof opening,
    and with a rear window which adjoins the motor vehicle roof,
    wherein the movable roof part arrangement has roof elements which are movably guided on lateral guides and which are lowerable from a closed position closing the roof opening into lowered position in a rear storage space which is located essentially under an equator line of the motor vehicle in which said roof opening is cleared, and wherein the rear window is movable, by guides on a body portion of the motor vehicle, from a closed position in which it closes a rear window opening and into an open position in which the window is removed from the rear window opening and is located at least partially under a trunk lid of a trunk of the vehicle; wherein the rear window is mounted to pivot, in an area of a rear edge thereof, around a transverse axis on a rear guide means.

2. Motor vehicle as claimed in claim 1, wherein the rear guide means has two parallel lengthwise-extending guide rails, each of which is located in a respective side area of the trunk.

3. Motor vehicle as claimed in claim 2, wherein bearing parts are attached to the rear window and are movably guided on the lengthwise-extending guide rails.

4. Motor vehicle as claimed in claim 3, wherein the bearing parts are coupled to sliding elements which are movably supported in the lengthwise-extending guide rails and which are movable by a drive means.

5. Motor vehicle as claimed in claim 4, wherein the rear window is coupled to a front guide means in an area of a forward edge thereof.

6. Motor vehicle comprising:
    a roof with body-mounted lengthwise-extending roof rails,
    a roof opening in the roof,
    a movable roof part arrangement for selectively closing and at least partially clearing the roof opening,
    and with a rear window which adjoins the motor vehicle roof,
    wherein the movable roof part arrangement has roof elements which are movably guided on lateral guides and which are lowerable from a closed position closing the roof opening into lowered position in a rear storage space which is located essentially under an equator line of the motor vehicle in which said roof opening is cleared, and
    wherein the rear window is movable, by guides on a body portion of the motor vehicle, from a closed position in which it closes a rear window opening and into an open position in which the window is removed from the rear window opening and is located at least partially under a trunk lid of a trunk of the vehicle; wherein the rear window is coupled to front guides in an area of a forward edge thereof; and wherein front guides of the rear window comprise a pair of nonparallel guide rails on which the rear window is movably supported via compensation elements.

7. Motor vehicle as claimed in claim 6, wherein the rear window, during opening thereof, is guided by the front guides in an initial lowering motion out of a rear window frame.

8. Motor vehicle as claimed in claim 6, wherein the lateral guides run alongside the roof rails and down to the storage space, and wherein the roof elements are stackable next to one another in a roughly vertical alignment in the storage space.

9. Motor vehicle a roof with body-mounted lengthwise-extending roof rails,
    a roof opening in the roof,
    a movable roof part arrangement for selectively closing and at least partially clearing the roof opening,
    and with a rear window which adjoins the motor vehicle roof,
    wherein the movable roof part arrangement has roof elements which are movably guided on lateral guides and which are lowerable from a closed position closing the roof opening into lowered position in a rear storage space which is located essentially under an equator line of the motor vehicle in which said roof opening is cleared, and
    wherein the rear window is movable, by guides on a body portion of the motor vehicle, from a closed position in which it closes a rear window opening and into an open position in which the window is removed from the rear window opening and is located at least partially under a trunk lid of a trunk of the vehicle; wherein the storage space for the roof elements is covered by a cover when the roof is closed, the cover being movable out of a covering position to enable the roof elements to be accommodated in the storage space; and wherein the cover is movable into a lowered position in which it forms a bottom of the storage space.

10. Motor vehicle as claimed in claim 9, wherein the movable roof part arrangement is a louvered roof and the roof elements are louvers of the louvered roof; wherein the lateral guides run alongside the roof rails and down to the storage space, and wherein the roof elements are stackable next to one another in a roughly vertical alignment on the cover in the storage space.

11. Motor vehicle as claimed in claim 10, wherein the louvers of the louvered roof are movable by a drive device which is located on an apron of the vehicle.

12. Motor vehicle as claimed in claim 11, wherein an additional drive device is operable for opening the rear window.

13. Motor vehicle as claimed in claim 1, wherein the lateral guides run alongside the roof rails and down to the storage space, and wherein the roof elements are stackable next to one another in a roughly vertical alignment in the storage space.

* * * * *